US006565965B1

(12) United States Patent
Harada et al.

(10) Patent No.: US 6,565,965 B1
(45) Date of Patent: May 20, 2003

(54) METAL/ORGANIC POLYMER COMPOSITE STRUCTURE CONTAINING ULTRAFINE METAL PARTICLES ARRANGED IN ROW AND PROCESS FOR PRODUCING THE SAME

(75) Inventors: Masafumi Harada, Nara (JP); Takeji Hashimoto, Kyoto (JP)

(73) Assignee: Japan Science and Technology Corporation, Saitama-Ken (JP)

( * ) Notice: Subject to any disclaimer, the term of this patent is extended or adjusted under 35 U.S.C. 154(b) by 0 days.

(21) Appl. No.: 09/530,179

(22) PCT Filed: Aug. 26, 1999

(86) PCT No.: PCT/JP99/04629

§ 371 (c)(1),
(2), (4) Date: Apr. 21, 2000

(87) PCT Pub. No.: WO00/12624

PCT Pub. Date: Mar. 9, 2000

(30) Foreign Application Priority Data

Sep. 1, 1998 (JP) ............................................. 10/262366

(51) Int. Cl.[7] ................................................. B32B 5/16
(52) U.S. Cl. ...................... 428/328; 428/323; 523/340; 524/356; 524/398; 524/439; 524/440; 524/441; 524/505
(58) Field of Search ............................ 428/411.1, 329; 523/340; 524/356, 398, 439, 440, 441, 505

(56) References Cited

U.S. PATENT DOCUMENTS 6,054,507 A * 4/2000 Funaki et al. ............... 523/210

FOREIGN PATENT DOCUMENTS

DE 19738913 * 3/1999

OTHER PUBLICATIONS

L. Leibler, Theory of Microphase Separation in Block Copolymers, Macromolecules 1980, vol. 13, No. 6, Nov-Dec. 1980, pp. 1602–1617.

* cited by examiner

*Primary Examiner*—Stevan A. Resan
*Assistant Examiner*—Christopher Paulraj
(74) *Attorney, Agent, or Firm*—Fay, Sharpe, Fagan, Minnich & McKee, LLP (57) ABSTRACT

A metal-organic polymer composite structure comprising a microphase-separated structure from a block copolymer composed of two or more polymer chains which are incompatible with each other bonded in an end-to-end manner, wherein one of the polymer phases of said microphase-separated structure selectively contains ultrafine metal particles arranged in a row or rows. A process for producing said metal-organic polymer composite structure, which comprises (i) the step of dissolving "metal ions" and "a block copolymer comprising one or more polymer chains having an affinity for the metal and, bonded thereto in an end-to-end manner, one or more polymer chains having no or little affinity for the metal" in a mixed solvent of "a high-boiling solvent having the ability to reduce the metal ion and having a boiling point of 80 to 200° C." and "a low-boiling solvent having a boiling point of 10 to 80° C."; (ii) the step of removing the low-boiling solvent at the boiling point thereof to cause the block copolymer to form a microphase-separated structure; and then (iii) the step of reducing the metal ions while removing the high-boiling solvent at the boiling point thereof.

4 Claims, 7 Drawing Sheets

METAL/ORGANIC POLYMER COMPOSITE STRUCTURE CONTAINING ULTRAFINE METAL PARTICLES ARRANGED IN ROW AND PROCESS FOR PRODUCING THE SAME

TECHNICAL FIELD

The present invention relates to a novel metal-organic polymer composite structure with high potential application in electronic materials, magnetic materials and optical materials and other purposes, and a process for producing the same.

BACKGROUND ART

The incorporation of ultrafine metal particles of nanometer size (metal nanoclusters) into a polymer (an organic polymer) to make a composite is an important technology for creating functional materials having new functions imparted thereto, such as electroconductivity, optical properties (linear or nonlinear), magnetic properties and the like.

For making such metal-organic polymer composite structures, there have hitherto been studied processes in which metal ions are selectively disposed in one of the phases constituting a microphase-separated structure from a block copolymer, followed by reducing the metal ions to the atomic metal by any suitable measure. The following is an overview of such conventional processes:

(1) A block Copolymer Composed of Polystyrene and Polyethylene Oxide (PS-b-PEO)

This is a process in which a block copolymer composed of polystyrene and polyethylene oxide (PS-b-PEO) is dissolved in a dilute toluene solution to form a micelle, a metal complex is formed in the core of the micelle by reacting chloroaurate ion with the PEO, and then gold fine particles with a diameter of about 4 nm are formed within the PEO phase through the irradiation of the metal ion complex with an electron beam [J. P. Spatz, A. Roescher, and M. Moeller, Adv. Mater. 8, 337 (1996); A. Roescher and M. Moeller, Polym. Mater. Sci. Eng. 73, 156 (1995); A. Roescher and M. Moeller, Polym. Mater. Sci. Eng. 72, 283 (1995)]. However, this process has a drawback in that the fine gold particles in the resultant structure are limited to ones with a hexagonal arrangement, due to the stable spherical micelle of the PS-b-PEO formed in the toluene solution.

(2) A Block Copolymer Composed of Polystyrene and poly(2-vinylpyridine) (PS-b-P2VP)

Chloroauric acid is added to a dilute toluene solution in which there has been dissolved a block copolymer composed of polystyrene and poly(2-vinylpyridine) (PS-b-P2VP), to prepare a solution containing chloroauric ion. To the resultant mixed solution is added hydrazine ($N_2H_4$) as a reducing agent to form fine gold particles [J. P. Spatz, S. Mossmer, and M. Moeller, Chem. Eur. J. 2, 1552 (1996)]. In this method there is a need to remove hydrazinium chloride ($N_2H_5Cl$), produced as a by-product in the solution, from the solution containing the fine gold particles.

(3) A Process Via the Complex Formation of Metal Ions with a Block Copolymer Containing a Phosphine Moiety A block copolymer containing a phosphine moiety is prepared, and then a metal salt is selectively disposed in the phosphine moiety, followed by a solvent casting to form a cast film. Heating the film to about 90° C. produces a composite film containing ultrafine metal particles such as silver particles [Y. Ng Cheong Chan, R. R. Schrock, and R. E. Cohen, J. Am. Chem. Soc. 114, 7295 (1992)], gold particles [Y. Ng Cheong Chan; R. R. Scrock, and R. E. Cohen, Chem. Mater. 4, 24 (1992)], and palladium or platinum particles [Y. Ng Cheong Chan, G. S. W. Craig, R. R. Schrock, and R. E. Cohen, Chem. Mater. 4, 885 (1992)]. This method may require much time for preparing the block copolymer containing a phosphine moiety.

(4) A Process in which Selective Incorporation of Metal Ions is Effected Through the Cross Linking of a Microphase-separated Structure Formed from a Block Copolymer The P2VP [poly(2-vinylpyridine)] domains of microphase-separated structure from a block copolymer composed of polystyrene and poly(1-vinylpyridine) (PS-b-P2VP) are crosslinked using 1,4-diiodobutane for the chemical fixation of the P2VP domains as well as the incorporation of iodine ions into the P2VP domains. The reaction of the iodine ions with silver ions results in the incorporation of a silver salt, followed by photo-irradiation to reduce the silver salt to silver nanoclusters present inside the P2VP domains [B. Saito, H. Kotsubo, and K. Ishizu, Polymer 33, 1073 (1992); R. Saito, S. Okamura, and K. ishizu, Polymer 33, 1099 (1992); R. Saito, S. Okamura, and K. Ishizu, Polymer 34, 1183 (1993); R. Saito, S. Okamura, and K. Ishizu, Polymer 34, 1189 (1993)]. The crosslinked PS-b-P2VP may be dissolved in a mixed solvent of 1,4-dioxane and an aqueous solution of silver nitrate. The resultant solution is then subjected to a step of forming a film so that silver nitrate is selectively contained in the P2VP domains, followed by a step of reducing the silver nitrate through photo-irradiation to form silver nanoclusters [R. Saito and K. Ishizu, Polymer 36, 4119 (1995)].

Another example of the processes for incorporating ultrafine metal particles into one of the phases of a block copolymer includes the one as described in [R. W. Zehner, W. A. Lopes, T. L. Morkved, H. Jaeger, and L. R. Sita, Langmuir. 14, 241 (1998)].

All of the above-mentioned processes need highly complicated steps for producing the composite structure (particularly the step for the reduction). In addition no particular attention has been paid to arranging such ultrafine metal particles in an orderly manner in the resultant composite structure and no measures have been proposed for this purpose.

DISCLOSURE OF INVENTION

It is an object of the present invention to establish a technology for obtaining a new type of metal-organic polymer composite structure, by taking advantage of a microphase-separated structure formed from a block copolymer, which is quite easy to prepare and in which ultrafine metal particles are arranged in an orderly manner in one of the polymer phases of the microphase-separated structure.

According to the present invention, the above-mentioned object is achieved by providing a metal-organic polymer composite structure comprising a microphase-separated structure from a block copolymer composed of two or more polymer chains which are incompatible with each other bonded in an end-to-end manner, wherein one of the polymer phases of said microphase-separated structure selectively contains ultrafine metal particles arranged in a row or rows. In a particularly preferred embodiment of the present invention, the microphase-separated structure from the block copolymer is of a lamellar structure.

According to the present invention there is also provided a process for producing such metal-organic polymer composite material, which process comprises (i) the step of dissolving "metal ions" and "a block copolymer comprising one or more polymer chains having an affinity for the metal and, bonded thereto in an end-to-end manner, one or more polymer chains having no or little affinity for the metal" in a mixed solvent of "a high-boiling solvent having the ability to reduce the metal ion and having a boiling point of 80 to 200° C." and "a low-boiling solvent having a boiling point of 10 to 80° C."; (ii) the step of removing the low-boiling solvent at the boiling point thereof to cause the block copolymer to form a microphase-separated structure; and then (iii) the step of reducing the metal ions while removing the high-boiling solvent at the boiling point thereof. A case is here excluded where both the boiling point of the low-boiling solvent and that of the high-boiling point are 80° C.

BEST MODE FOR CARRYING OUT THE INVENTION

The process of the present invention comprises quite simple operations of dissolving a block copolymer and metal ions to be incorporated into the copolymer in a mixed solvent of two solvents having different boiling points, followed by removing such solvents by vaporization. Furthermore, the composite structure produced by the process features a unique structure wherein ultrafine metal particles are arranged in an orderly and one-dimensional manner, i.e. arranged in a row or rows, which has never been seen in conventional metal-organic polymer composite structures.

The explanation of the present invention will be given below by referring to the constituent components of the metal-organic polymer composite structure and the steps of producing the same.

(1) Block Copolymer

In principale any block copolymer can be used to produce the metalorganic polymer composite structure of the present invention, provided that it is composed of one or more "polymer chains having an affinity for the metal" and, bonded thereto in an end-to-end manner, "one or more polymer chains having no or little affinity for the metal (i.e. having a sufficiently low affinity for the metal as compared with the polymer chain having an affinity for the metal ions) and being incompatible with the polymer chain(s) having an affinity for the metal ions.

"Polymer Chain Having an Affinity for Metal Ion"

As a polymer chain having an affinity for the metal, there can be exemplified a polymer composed of a monomer unit having a nitrogen atom such as poly(2-vinylpyridine), polyaminostyrene or the like; a polymer composed of a monomer unit having an oxygen atom such as poly(methyl methacrylate) or the like; a polymer composed of a monomer unit containing sulfur such as poly(propylene sulfide). Any polymer is acceptable providing it basically has an affinity for metals or metal ions. For obtaining stable ultrafine metal particles and a wide range of freedom in selecting the counterpart polymer chain, a polymer chain composed of a monomer unit having a high affinity for the metal is preferred. Preferable examples include poly(2-vinylpyridine) and poly(4-vinylpyridine). The number average molecular weight (Mn) of the polymer chain having an affinity for the metal may be from 1,000 to 1,000,000 and is preferably from 5,000 to 1,000,000. It is more preferable from 30,000 to 500,000 in view of ease of synthesizing a polymer and the stability of the resultant protected cluster.

"Polymer chain having no affinity for the metal or having a sufficiently low affinity for the metal as compared with the polymer chain having an affinity for the metal":

Any type can be used as the polymer chain for constituting the counterpart of the block copolymer, provided that it meets the requirements or conditions for the formation of a microphase-separated structure, i.e., "it is incompatible with the polymer chain having an affinity for the metals and has no affinity or has a sufficiently low affinity for the metal as compared with the polymer chain having an affinity for the metal."

The type of microphase-separated structure formed from a block copolymer can be controlled by controlling the volume ratio of the phase composed of a polymer chain or chains having an affinity for the metal in the block copolymer (which phase will be the one containing the ultrafine metal particles). Such volume ratio will vary depending upon types of monomer unit combination for composing the block copolymer and solvent employed in forming the structure. For obtaining a lamellar structure, which is a particularly preferred microphase-separated structure in the present invention, the ratios of the molecular weights of the respective polymer chains are controlled aiming at a volume ratio of 20 to 80%, preferably 30 to 70%, more preferably 40 to 60%. The process of the present invention is applicable for producing a microphase-separated structure in which the phase containing ultrafine metal particles is of a cylindrical structure or of a spherical structure. In such case, the volume ratio values are generally lower as compared with those for a lamellar structure as mentioned above.

(2) Metal Ions

Metal ions for producing the metal-organic polymer composite structure in accordance with the process of the present invention are added as a metallic compound, generally as a metal salt or as a metal complex, which is soluble in both the high-boiling solvent and the low-boiling solvent, as will be described later. The metal ions present in the solvents are reduced to metals in the subsequent step.

While there is no particular limitation on the types of metals to which the present invention can be applied, examples of usable metals include transition metals, for example, metals of Group VIII, particularly various noble metals.

(3) High-boiling, Solvent and Low-boiling Solvent

The high-boiling solvent used in the process for producing the metalorganic polymer composite structure of the present invention is a solvent which can dissolve the block copolymer and the metal ions (the metallic compound) as described above and also has an ability to reduce the metal ions at the boiling point thereof. On the other hand, the low-boiling solvent used in the process of the present invention is a solvent which can dissolve the block copolymer and the metal ions (the metallic compound) as described above but has no ability to reduce the metal ions at the boiling point thereof.

For the ability to dissolve the polymer and the metal ion as well as for easy operation, it is generally preferred that a low-boiling solvent having a boiling point of 10 to 80° C. be used with a high-boiling point solvent having a boiling point of 80 to 200° C. An example of a particularly preferred combination of solvents is chloroform (low-boiling solvent) in combination with benzylalcohol (high-boiling solvent). Other unlimited examples of the high-boiling solvent include alcohols such as 1-butanol, and amines or amides such as ethylenediamine or formamide. Unlimited examples of the low-boiling solvent used in the process of the present invention include dichloromethane, tetrahydrofuran, benzene and carbon tetrachloride.

(4) Production of the Metal-organic Polymer Composite Structure

Figure 1:
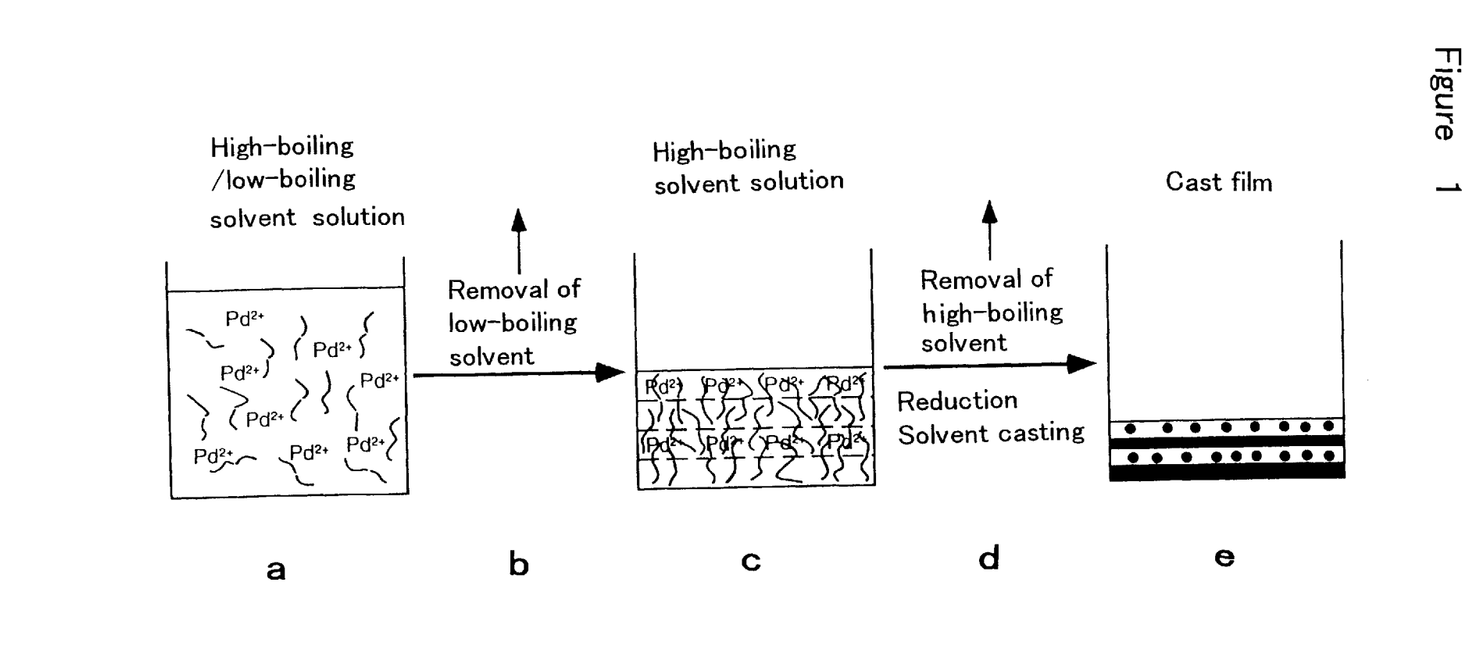
FIG. 1 illustrates the steps of the process for producing the metal-organic polymer composite structure of the present invention.

The first step for producing the metal-organic polymer composite structure in accordance with the present invention is dissolving the block copolymer and the metal ions (the metallic compound) as described above in a mixed solvent of a high-boiling solvent and a low-boiling solvent (see FIG. 1, a).

The ratio of the high-boiling point and the low-boiling point solvent is adjusted in such a manner that the total amount of the solvents is sufficient to dissolve the block copolymer to form a solution in which the block copolymer is randomly mixed (generally, with the concentration of the block copolymer being about 1 to 10% by weight), and also that, upon the removal of the low-boiling solvent in the subsequent step, there is obtained a solution of sufficiently concentrated polymer in the high-boiling solvent to form a microphase-separated structure from the block copolymer (generally, with the concentration being about 30 to 50% by weight as the block copolymer).

The amount of metal ions (metallic compound) to be added is determined depending upon the properties of the desired composite structure. One of the characteristic features of the process for producing the metal-organic polymer composite structure of the present invention is that an extremely high amount of a metal can be added, i.e. approx. 1 to 30% by weight as the amount of the metal added/the amount of the polymer.

Following the above-mentioned step of dissolving the block copolymer and the metal ions (the metallic compound) in the mixed solution, the system is kept at a low temperature, i.e. at the temperature of the boiling point of the low-boiling solvent so as to slowly remove the low-boiling solvent by vaporization (see FIG. 1, b). At this stage, the metal ions have not yet been reduced.

Upon the removal of the low-boiling solvent, there is formed a solution of extremely concentrated block copolymer in the high-boiling solvent resulting in the formation of a microphase-separated structure from the block copolymer, which will cause the incorporation of the metals as the metal ions into the phase composed of the polymer chain having an affinity for the metal (see FIG. 1, b). (see FIG. 1, c).

Thereafter: the system is held at a high temperature, i.e. at the temperature of the boiling point of the high-boiling solvent so as to proceed with the reduction reaction of the metal ions while removing the high-boiling solvent (see FIG. 1, d). Thus, as the microphase-separated structure becomes more stabilized, there is obtained a metal-organic polymer composite structure in which the metal particles (ultrafine metal particles) resulting from the reduction are arranged within one polymer phase (the phase composed of the polymer chain having an affinity for the metal) of the microphase-separated structure (see FIG. 1, e).

(5) Structural Determination of the Composite Structure

Through transmission electron microscopic (TEM) observations of thus prepared metal-organic polymer composite structures, it was found that ultrafine metal particles (metal clusters) are contained selectively in one polymer phase (the phase composed of polymer chain having an affinity for the metal) of the microphase-separated structure and are arranged in a row or rows along said phase and that, as the metal content increases, metal clusters are present in plural rows overlapping each other. It was further found, through SAXS (Small-Angle X-ray Scattering) measurement as well as TEM observation, that the composite structure of the present invention is a stable orderly structure, i.e., a microphase-separated structure (particularly a lamella structure).

The present invention is particularly suitable for the production of a metal-organic composite structure of a lamella structure among various types of microphase-separated structures. It was found through TEM and SAXS that the resultant composite structure takes a lamellar structure composed of two types of phases present one after another having a domain size on the order of several tens of nanometers, with one being the phase of the metal and the polymer having an affinity for the metal and the other being the phase of the polymer having no (or low) affinity for the metal, and that ultrafine metal particles (metal clusters) having a particle diameter on the order of several nanometers are arranged in a row or rows (i.e., arranged orderly and one-dimensionally) within the phase of the polymer having an affinity for the metal. While the present invention can also be applied to other types of microphase-separated structures such as those of cylindrical or spherical structures, there is a tendency in these structures for the morphology of the microphase-separated structure and the arrangement of metal clusters to become somewhat disorderly.

The orderly one-dimensional arrangement of ultrafine metal particles (metal clusters) is considered to be caused by the following mechanisms 1) through 4):

1) Metal is selectively incorporated as metal ions into the phase composed of a polymer chain having an affinity for the metal, to form a ion complex with the polymer chain.

2) The ion complex is reduced in a high-boiling solvent at the boiling point thereof, to form a metal particles-organic polymer composite structure.

3) In the step of the reduction and casting operation (FIG. 1, d), where vaporization of the high-boiling solvent as well as reduction reaction occur, the diffusion of the metal particles is extremely slow because of a rapid decrease in the amount of the solvent, resulting in the retention of the metal particles within the phase of the polymer chain having an affinity for the metal.

4) Further, the treatment at a high temperature for 8 to 10 hours will cause the aggregation of metal particles (or a phenomenon similar to sintering) to form secondary particles (aggregates arranged in a row).

EXAMPLE

While working examples are given below to further illustrate the characteristic features of the present invention, the present invention is not limited to these examples.

Example 1

In a mixed solvent of benzyl alcohol 0.6 ml and chloroform 5.4 ml, was dissolved a diblock copolymer composed of polyisoprene (PI) having a number average molecular weight of 18,000 and poly(2-vinylpyridine) (P2VP) having a number average molecular weight of 12,600 [hereinafter, the diblock copolymer is abbreviated as PI(18000)-b-P2VP (12600); throughout the specification, any diblock copolymer is expressed in a similar abbreviated manner.] (molecular weight ratio=59/41; heterogeneity index Mw/Mn=1.04), to prepare a solution of the block copolymer PI-b-P2VP of about 5% by weight, to which was added palladium acetylacetonate [hereinafter, abbreviated as Pd(acac)$_2$]. The amounts of Pd(acac)$_2$ added were 24.1 mg [8% by weight based on the polymer (2.8% by weight as the metal content)], 60.3 mg [20% by weight (7.0% by weight as the metal content), 120.5 mg [40% by weight (14% by weight as the metal content)] and 241 mg [80% by weight (28% by weight as the metal content)]. For comparison, a structure not containing the metal was also prepared by not adding Pd(acac)$_2$.

Following the addition of a predetermined amount of Pd(acac)$_2$, the chloroform was removed by vaporization over a period of one day at room temperature (at about 30° C. in a thermostat) to prepare a solution of concentrated block copolymer PI-b-P2VP (the polymer concentration being 33% by weight).

Then the vaporization of benzyl alcohol was carried out on a hot plate (kept at 140° C.) for a period of about 8 hours to form a cast film. As the vaporization of the solvent proceeded, it was observed that the film changed to exhibit a blackish color indicating the formation of Pd clusters.

Here, benzyl alcohol serves an a reducing agent as well as a casting solvent. The resultant film was dried at room temperature for 24 hours under vacuum. Morphological studies of the microphase-separated structures of the cast films were made by SAXS measurement as well as TEM observation of ultrathin segments of the films. In a similar manner (but without the addition of Pd(acac)$_2$), a cast film of the PI-b-P2VP not containing the metal ion was also prepared for morphological studies of the microphase-separated structure thereof in comparison with those of the cast films of the PI-b-P2VP containing the metal clusters.

Figure 2:
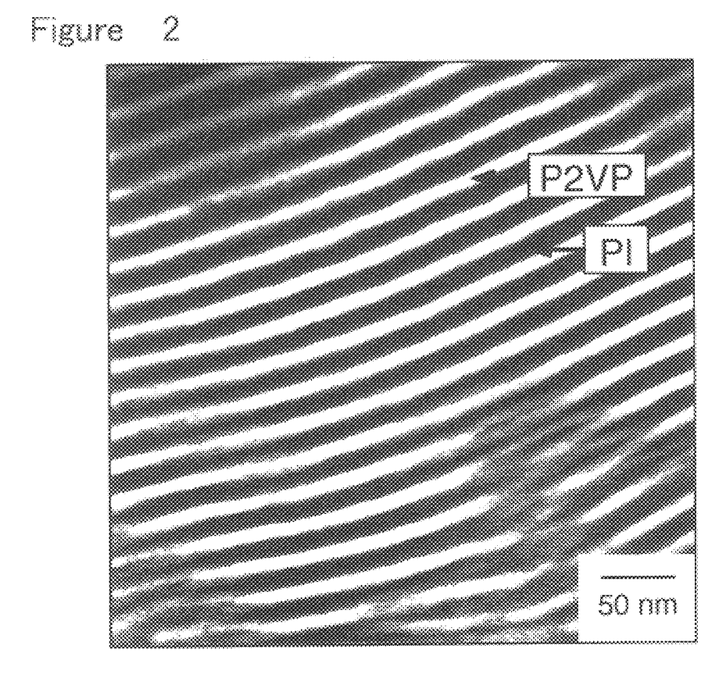
FIG. 2 is a transmission electron micrograph of the cast film prepared from block copolymer PI(18000)-b-P2VP (12600) not containing metal ions, as a comparative example of the metal-organic composite structure of the present invention.
Figure 3:
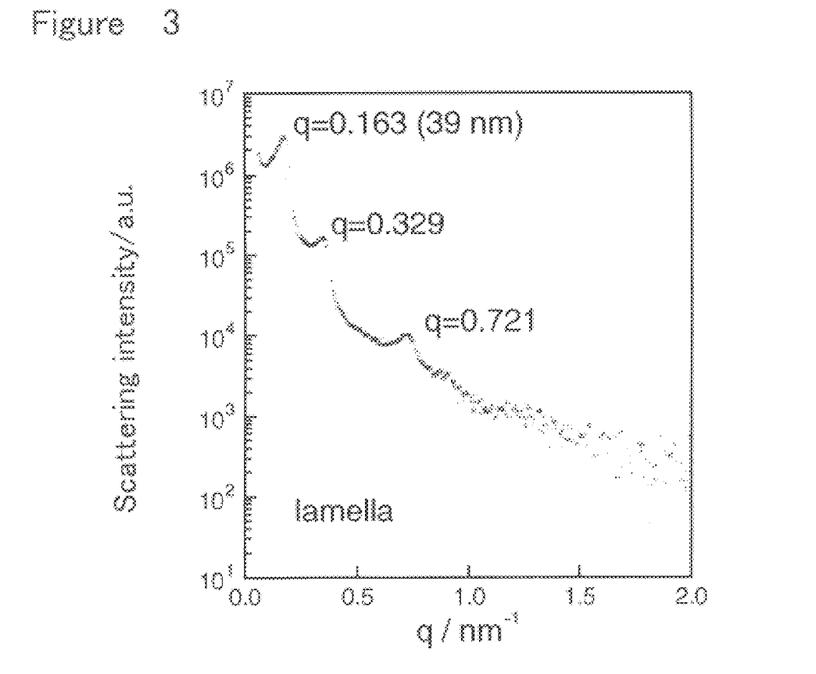
FIG. 3 is a SAXS profile of the cast film as shown in FIG. 2.

FIG. 2 is a TEM micrograph of the cast film prepared from a solution of the block copolymer PI(18000)-b-P2VP (12600) not containing the metal ions. The TEM observation reveals that there was formed a microphase-separated structure of a lamellar structure (with the spacing between the domains being about 25 nm) from the PI-b-P2VP. The SAXS measurement shows a first-order lattice scattering peak at q=0.163 nm$^{-1}$ which corresponds the spacing between the domains of about 39 nm. In addition to the first-order peak, there were also observed third-order lattice scattering peaks at the positions of integer times of the position of the first-order peak (see FIG. 3).

Figure 4:
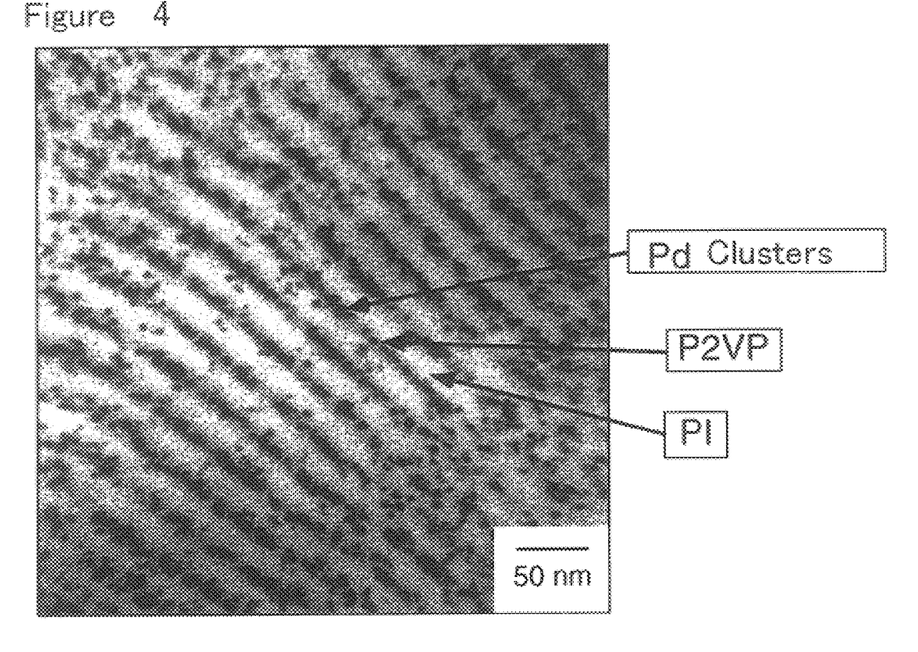
FIG. 4 is a transmission electron micrograph of the cast film prepared from block copolymer PI(18000)-b-P2VP (12600) with $Pd(acac)_2$ addition in an amount of 8% by weight, as an example of the metal-organic polymer composite of the present invention.

FIG. 4 is a TEM micrograph of a cast film prepared from the solution containing the block copolymer PI(18000)-b-P2VP(12600) (300 mg) and Pd(acac)$_2$ (24.1 mg: 8% by weight). In the photograph, the bright portions show the PI phase, the slightly dark portions show the P2VP phase and the black dots show the Pd clusters. The TEM observation reveals that the microphase-separated structure produced from the PI-b-P2VP is of a lamellar structure (with the spacing between the domains being about 30 to 35 nm) in which Pd clusters of about 4 nm are arranged one-dimensionally in the center of the P2VP phase.

Figure 5:
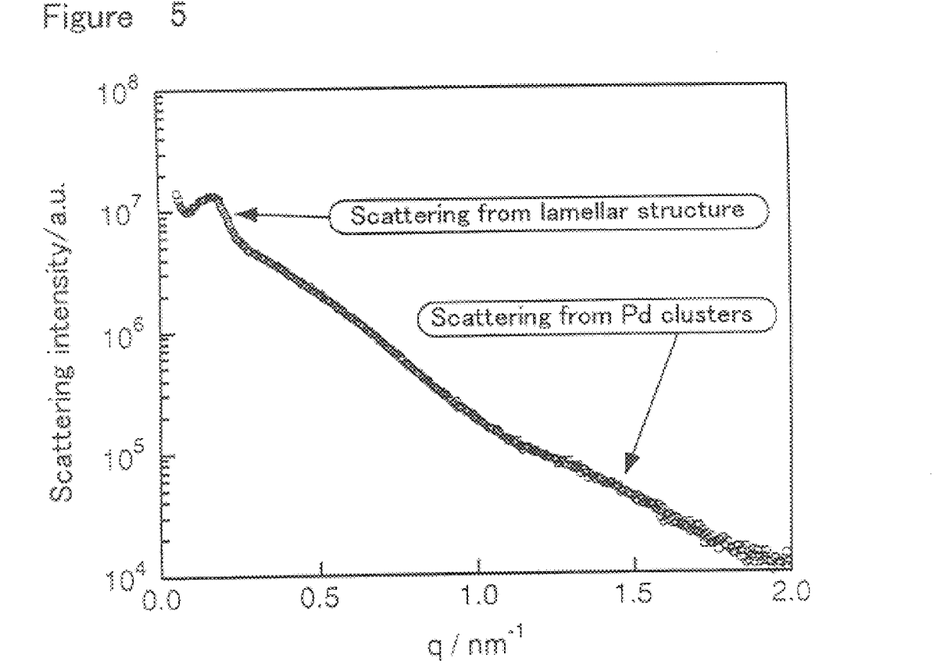
FIG. 5 is a SAXS profile of the cast film as shown in FIG. 4.

FIG. 5 is a SAXS profile of this sample, which shows the scattering curve resulting from the lamellar structure as a matrix as well as the scattering curve resulting from the Pd clusters. As shown in the profile, there is observed a first-order peak of lattice scattering at q=0.171 nm$^{-1}$, which corresponds to the spacing between the domains of about 35 nm, as well as the scattering resulting from the Pd clusters, which indicates that the Pd cluster size is about 5 nm at maximum. These observations are in good agreement with the TEM observation.

FIG. 2 is a TEM micrograph in which the system was stained with osmium oxide (OsO$_4$) whereas FIG. 4 is an unstained TEM micrograph. Stained TEM observations were also made on the system as shown in FIG. 4, where the contrast between the PI phase and the P2VP phase was reversed. However, the contrast is clearer without staining and unstained TEM micrographs are shown here for the composite structures containing the metal including those given below.

TEM observation and SAXS measurement were also carried out for the cast films prepared by adding the increased amounts of the metal salt [Pd(acac)$_2$]. The following are some of the results.

Figure 6:
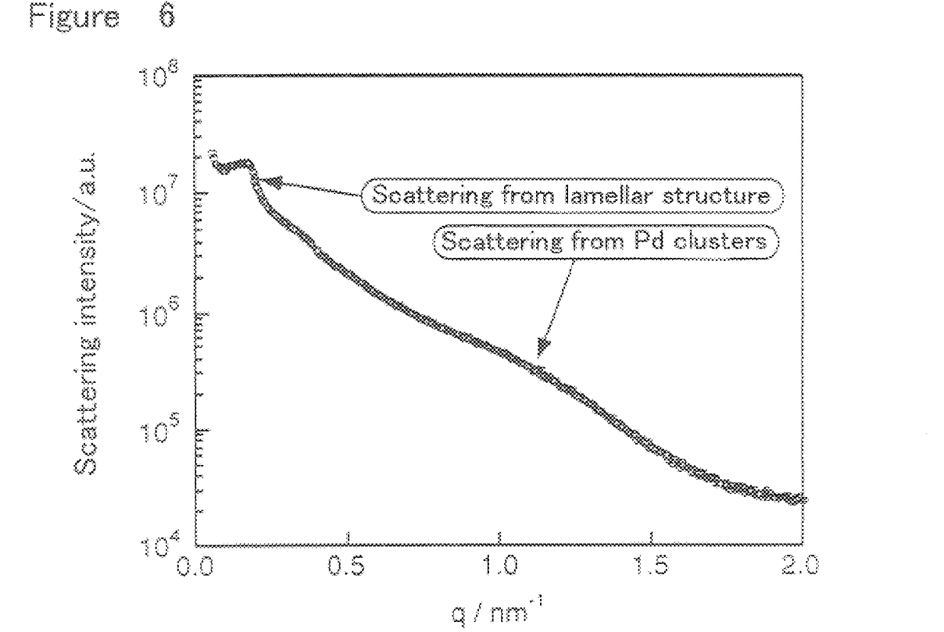
FIG. 6 is a SAXS profile of the cast film prepared from block copolymer PI(18000)-b-P2VP(12600) with $Pd(acac)_2$ addition in an amount of 20% by weight, as an example of the metal-organic polymer composite of the present invention.

FIG. 6: A SAXS profile of the cast film with Pd(acac)$_2$ addition in an amount of 60.3 mg (20% by weight).

Figure 7:
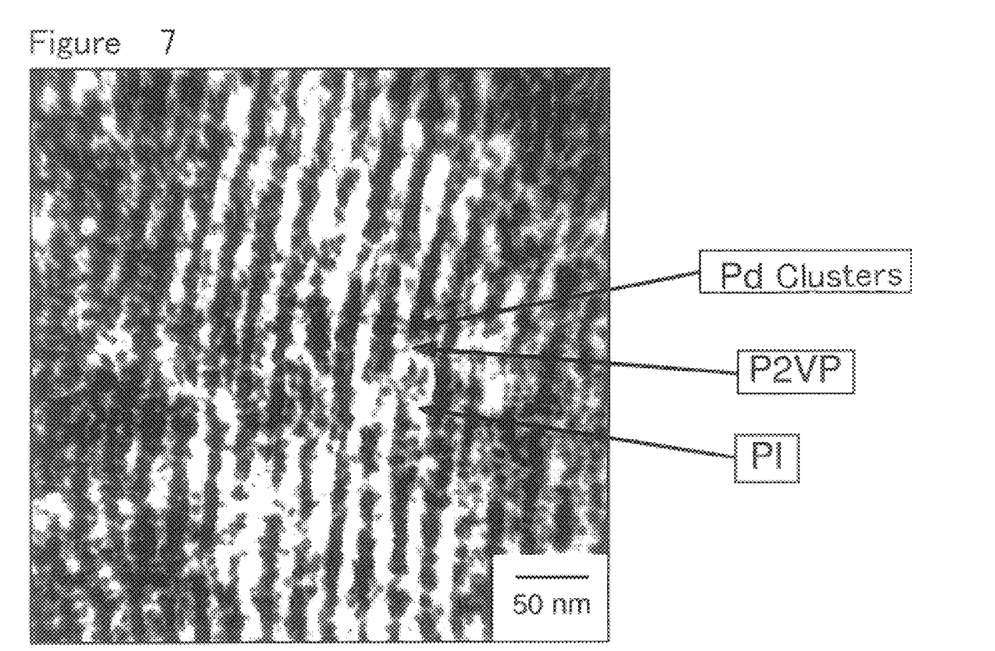
FIG. 7 is a transmission electron micrograph of the cast film prepared from block copolymer PI(18000)-b-P2VP (12600) with $Pd(acac)_2$ addition in an amount of 40% by weight, as an example of the metal-organic polymer composite of the present invention.

FIG. 7: A TEM micrograph of the cast film with Pd(acac)$_2$ addition in an amount of 120.5 mg (40% by weight).

Figure 8:
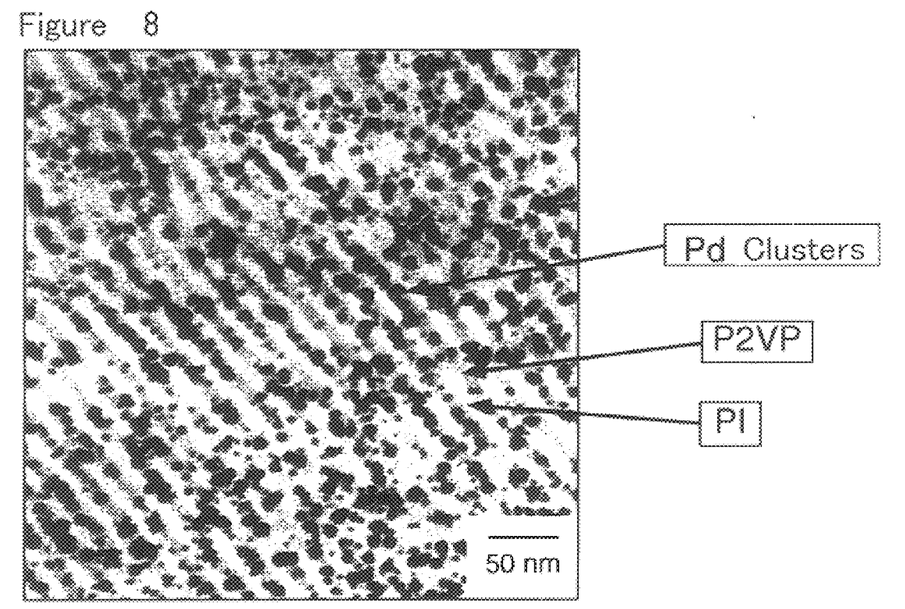
FIG. 8 is a transmission electron micrograph of the cast film prepared from block copolymer PI(18000)-b-P2VP (12600) with $Pd(acac)_2$ addition in an amount of 80% by weight, as an example of the metal-organic polymer composite of the present invention.

FIG. 8: A TEM micrograph of the cast film with Pd(acac)$_2$ addition in an amount of 241 mg (80% by weight).

From these TEM observations it is seen that the lamellar structure having a spacing between the domains of about 25 to 35 nm is retained even when the metal content is increased. This fact is supported by the SAXS measurements, which reveal almost no change in the position of the scattering peak resulting from the lamellar structure at 0.16 to 0.17 nm$^{-1}$. While it is observed that the particle sizes of the Pd clusters tend to increase with increasing metal content, the particle sizes expressed in diameter are about 5 to 6 nm at maximum. This fact is also in a good agreement with the results of the SAXS measurements.

Example 2

Cast films were prepared in the similar manner of Example 1, except that PI(76000)-b-P2VP(23500) (molecular weight ratio=76/24; heterogeneity index Mw/Mn=1.04) was used as a block copolymer in place of PI(18000)-b-P2VP(12600). Some of the TEM observations are shown here FIG. 9: A TEM micrograph of the cast film with Pd(acac)$_2$ addition in an amount of 24.1 mg (8% by weight).

Figure 10:
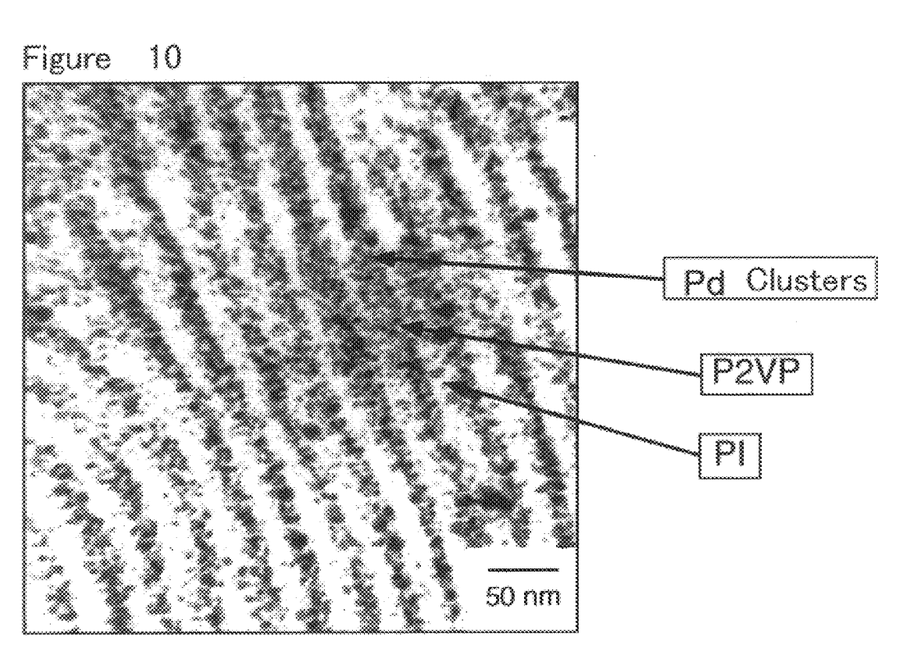
FIG. 10 is a transmission electron micrograph of the cast film prepared from block copolymer PI(76000)-b-P2VP (23500) with $Pd(acac)_2$ addition in an amount of 40% by weight, as an example of the metal-organic polymer composite of the present invention.

FIG. 10: A TEM micrograph of the cast film with Pd(acac)$_2$ addition in an amount of 120.5 mg (40% by weight).

Figure 11:
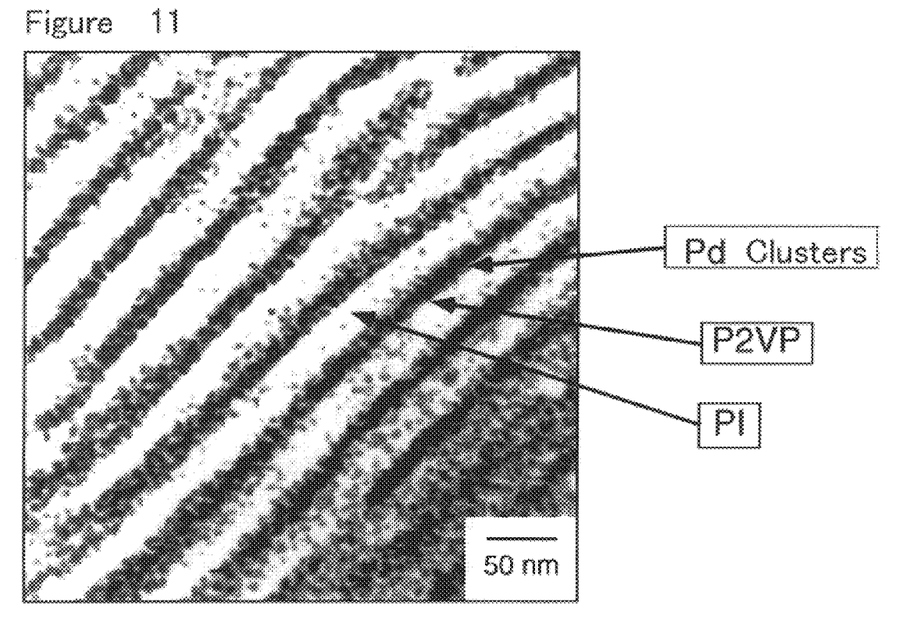
FIG. 11 is a transmission electron micrograph of the cast film prepared from block copolymer PI(76000)-b-P2VP (23500) with $Pd(acac)_2$ addition in an amount of 80% by weight, as an example of the metal-organic polymer composite of the present invention.

FIG. 11: A TEM micrograph of the cast film with Pd(acac)$_2$ addition in an amount of 241 mg (80% by weight).

Figure 9:
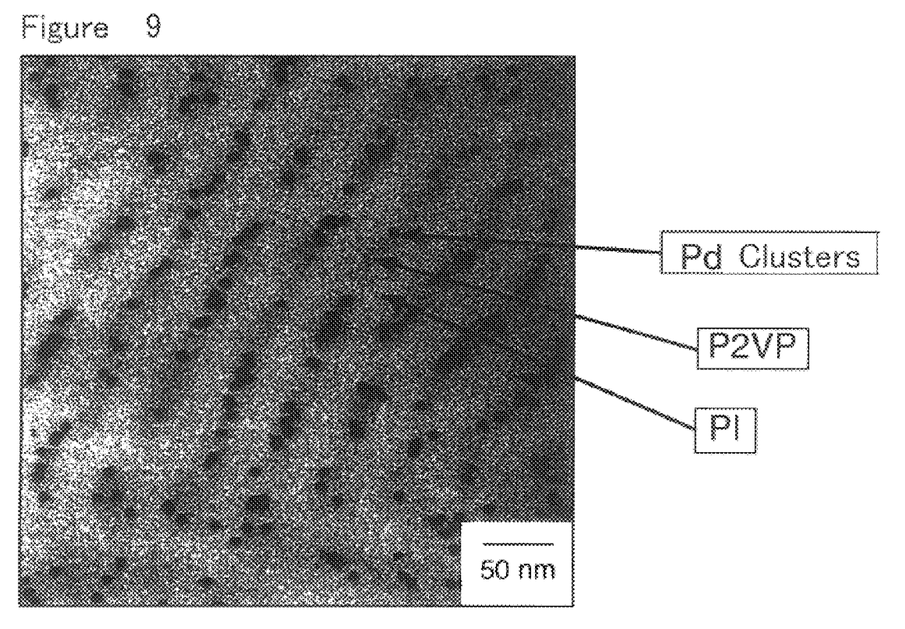
FIG. 9 is a transmission electron micrograph of the cast film prepared from block copolymer PI(76000)-b-P2VP (23500) with $Pd(acac)_2$ addition in an amount of 8% by weight, as an example of the metal-organic polymer composite of the present invention.

These TEM observations demonstrate that a lamellar structure (with the spacing between the domains of about 40 to 50 nm) is formed in which the P2VP phase contains Pd clusters with a size of about 4 to 8 nm arranged along the phase.

Figure 12:
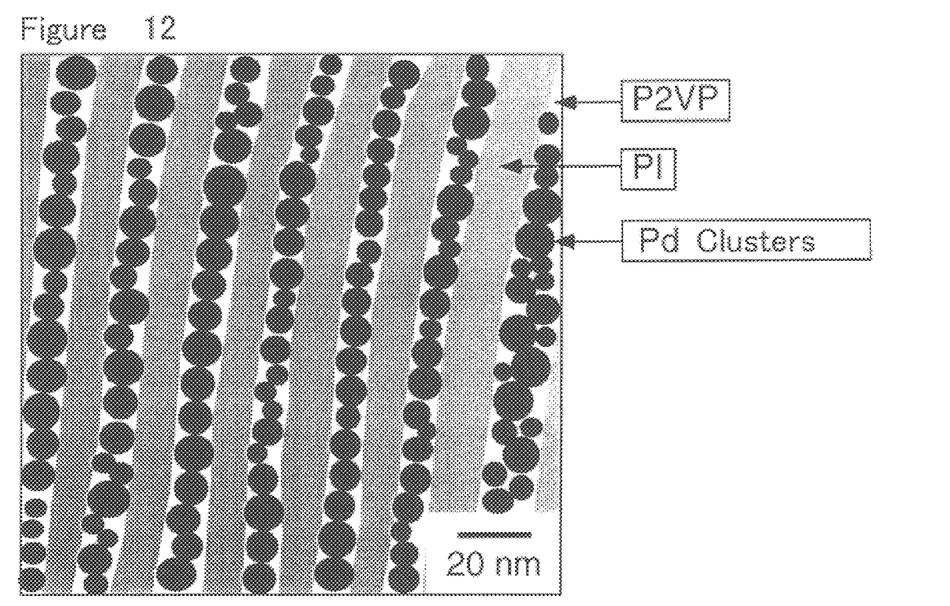
FIG. 12 is a schematic expression illustrating the TEM observations of the metal-organic polymer composite structures (the cast films) of the present invention, in a case where the metal content is relatively low.
Figure 13:
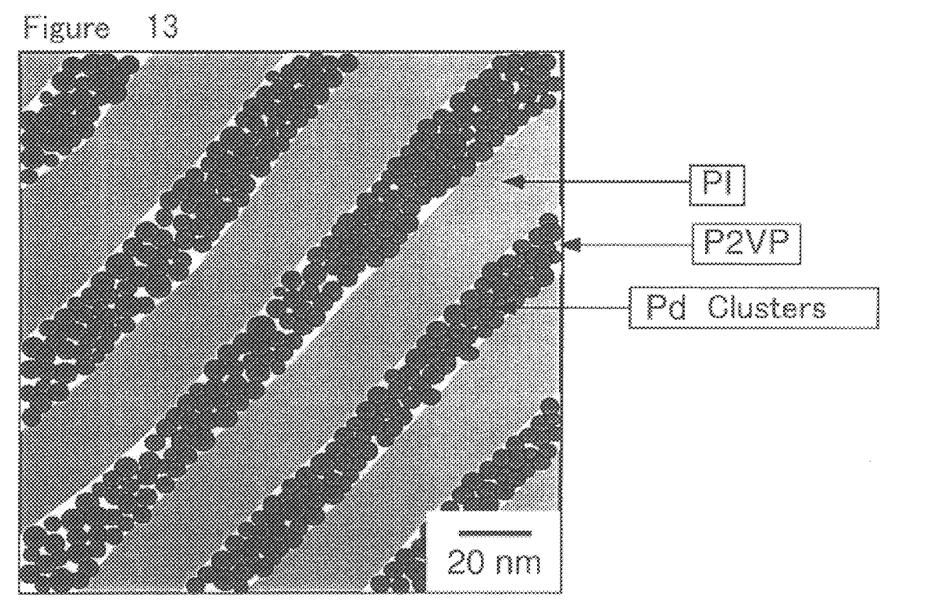
FIG. 13 is a schematic expression illustrating the TEM observations of the metal-organic polymer composite structures (the cast films) of the present invention, in a case where the metal content is high.

FIG. 12 and FIG. 13 are schematic expressions of the results of the TEM observations of the cast films prepared by the present invention, for easy understanding thereof. FIG. 12 shows a typical case in which the metal content is relatively low as in the case shown in FIG. 4, whereas FIG. 13 shows a typical case in which the metal content is high as in the case shown in FIG. 11. Thus, in the cast films (the metal-organic polymer composite structures) of the present invention, one of the phases composing the microphase-separated structure contains ultrafine metal particles arranged in a row along the phase and, as the metal content increases, the metal clusters are arranged in plural rows overlapping each other within the polymer phase.

INDUSTRIAL APPLICABILITY

In accordance with the present invention, it is possible to produce a metal-organic polymer composite structure composed of a microphase-separated structure by an extremely easy process, i.e., simply by dissolving a block copolymer and a metallic compound as the starting materials in a mixture of the two different types of solvents and then removing such solvents one after another by vaporization.

The metal-organic polymer composite structure of the present invention has a unique morphology wherein ultrafine metal particles are arranged in a row or rows in a polymer phase. Particularly, the composite structure of a lamellar structure according to the present invention is, among various types of microphase-separated structures, preferable in that it takes a lamellar structure composed of the phase of the polymer having an affinity for the metal and the phase of the polymer having no affinity for the metal, being present one after another with a domain size on the order of several tens of nanometers, and that ultrafine metal particles (metal clusters) having a particle diameter of 10 nm or smaller are arranged orderly and one-dimensionally within the metal-affinitive phase. Thus, such composite structure is applicable, as it is or after removing the phase of the polymer having no affinity for the metal in any suitable manner, to new types of electronic materials, magnetic materials or optical materials which will exhibit anisotropic properties.

What is claimed is:

1. A metal-organic polymer composite structure comprising a microphase-separated structure from a block copolymer composed of two or more polymer chains which are incompatible with each other bonded in an end-to-end manner, wherein one of the polymer phases of said microphase-separated structure selectively contains ultrafine metal particles arranged in a row or rows.

2. The metal-organic polymer structure of claim 1, wherein the microphase-separated structure from the block copolymer is of a lamellar structure.

3. A process for producing the metal-organic polymer composite structure of claim 1, which comprises (i) the step of dissolving metal ions and a block copolymer comprising one or more polymer chains having an affinity for the metal and, bonded thereto in an end-to-end manner, one or more polymer chains having no or little affinity for the metal in a mixed solvent of a high-boiling solvent having the ability to reduce the metal ion and having a boiling point of 80 to 200° C. and a low boiling solvent having a boiling point of 10 to 80° C.; (ii) the step of removing the low-boiling solvent at the boiling point thereof to cause the block copolymer to form a microphase-separated structure; and then (iii) the step of reducing the metal ions while removing the high-boiling solvent at the boiling point thereof.

4. A process for producing the metal-organic polymer composite structure of claim 2, which comprises (i) the step of dissolving metal ions and a block copolymer comprising one or more polymer chains having an affinity for the metal and, bonded thereto in an end-to-end manner, one or more polymer chains having no or little affinity for the metal in a mixed solvent of a high-boiling solvent having the ability to reduce the metal ion and having a boiling point of 80 to 200° C. and a low boiling solvent having a boiling point of 10 to 80° C.; (ii) the step of removing the low-boiling solvent at the boiling point thereof to cause the block copolymer to form a microphase-separated structure; and then (iii) the step of reducing the metal ions while removing the high-boiling solvent at the boiling point thereof.

* * * * *